May 22, 1956  R. L. HIGGINS  2,746,077
ELECTRICALLY-HEATED WINDSHIELD WIPER
Filed May 31, 1952  3 Sheets-Sheet 1
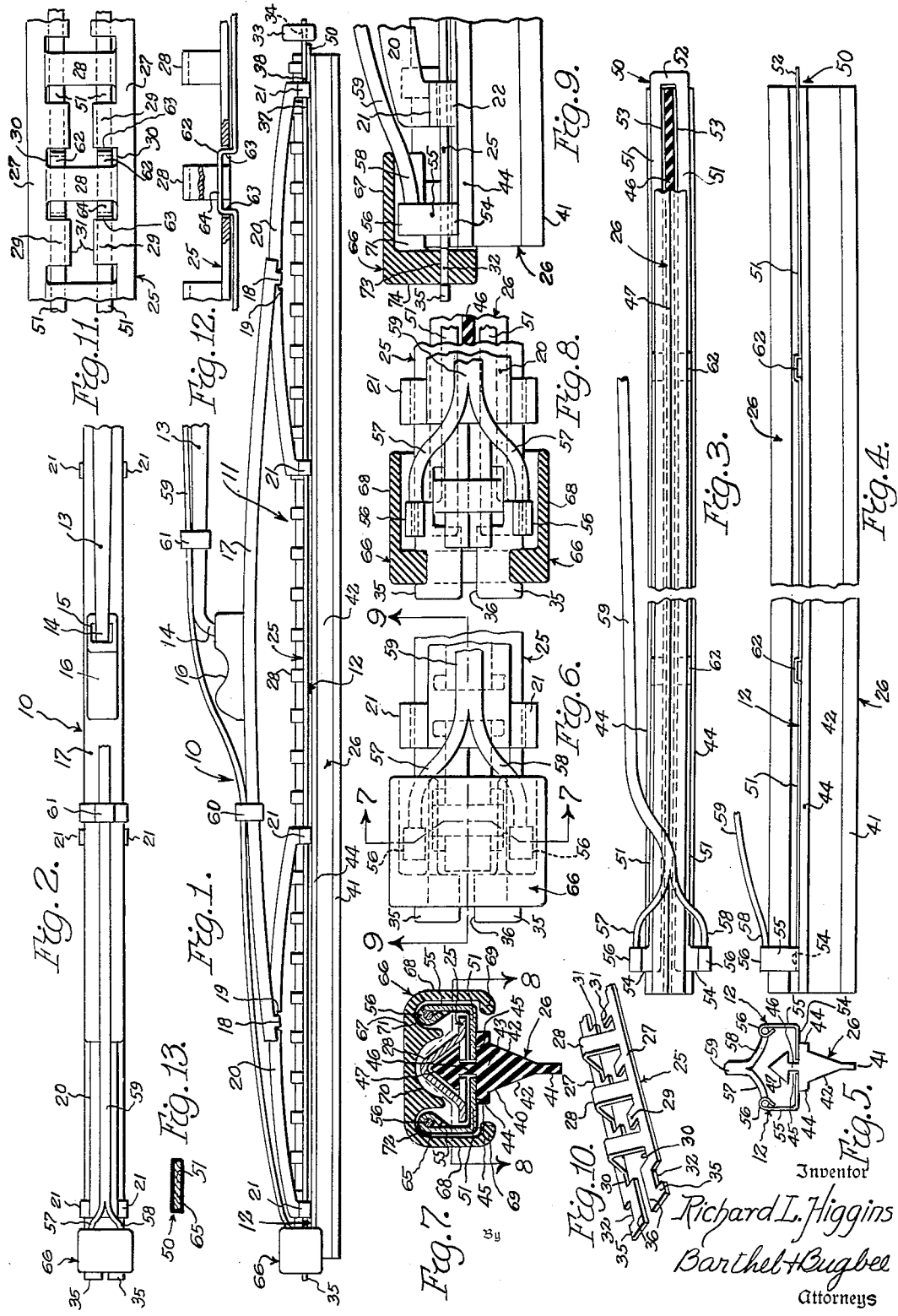
Inventor
Richard L. Higgins
Barthel + Bugbee
Attorneys

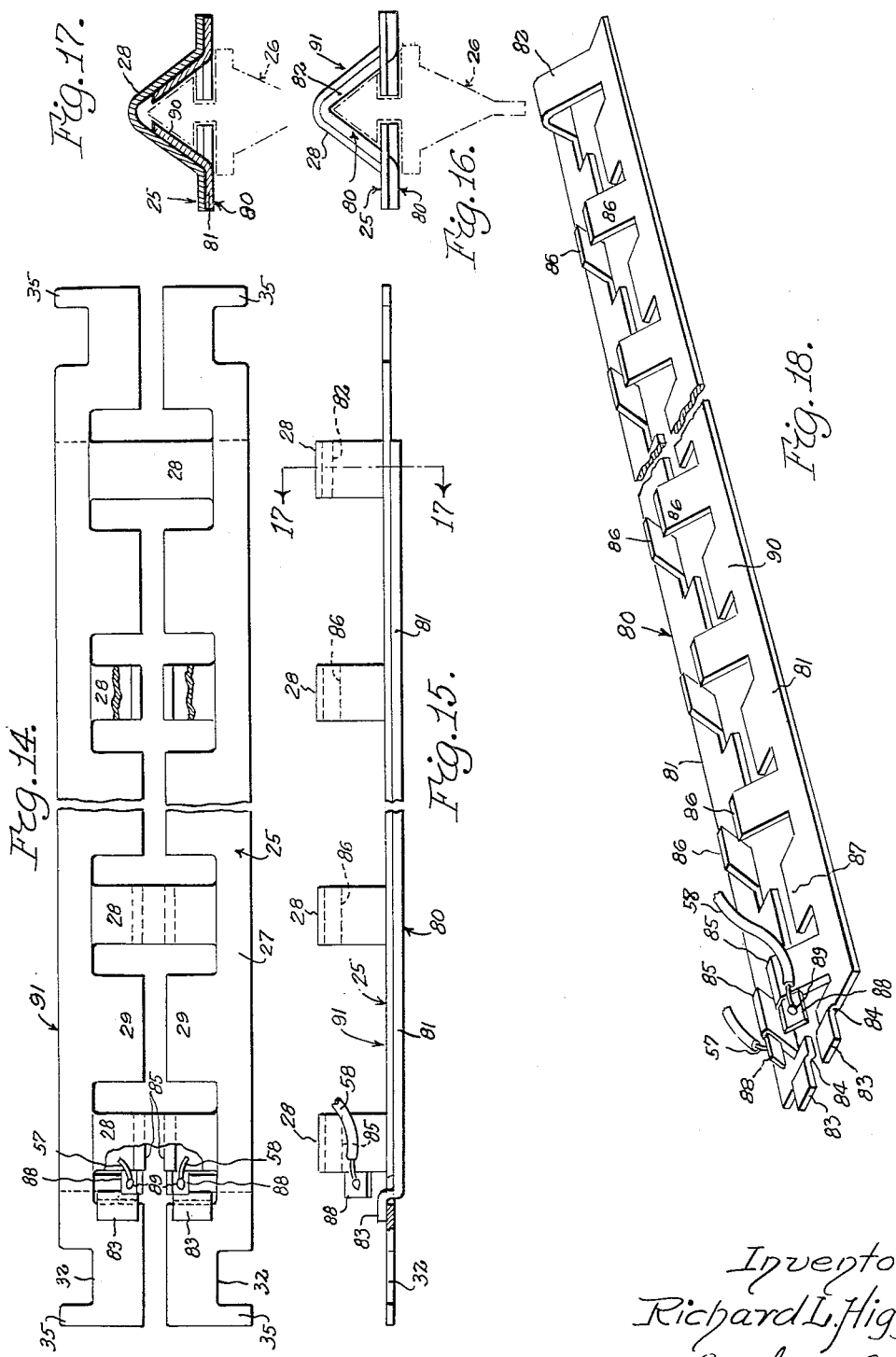

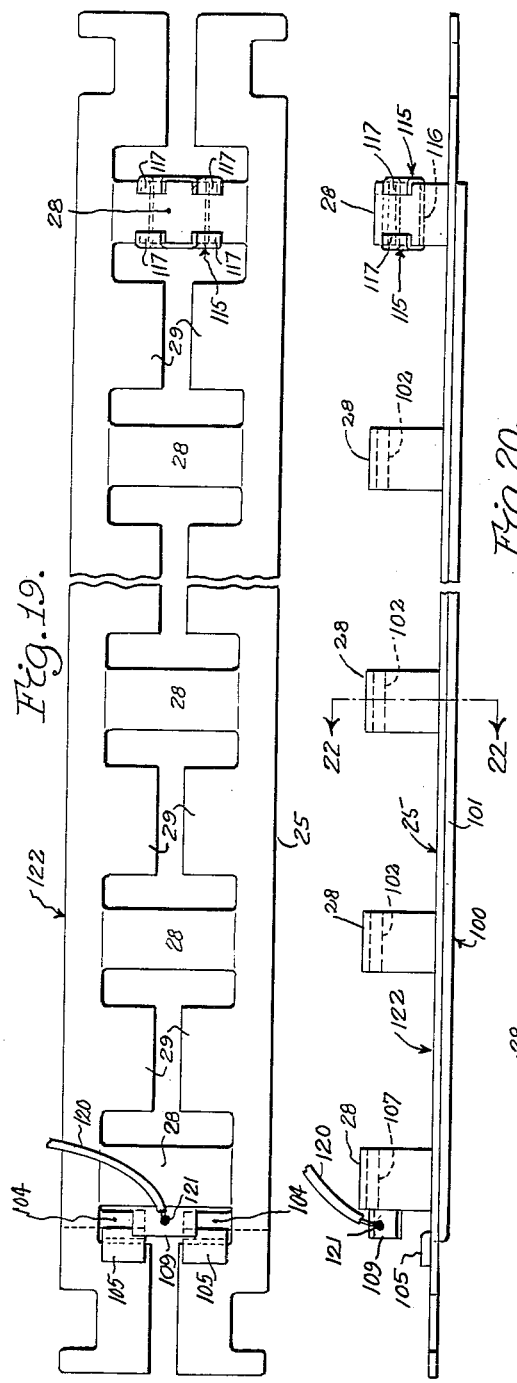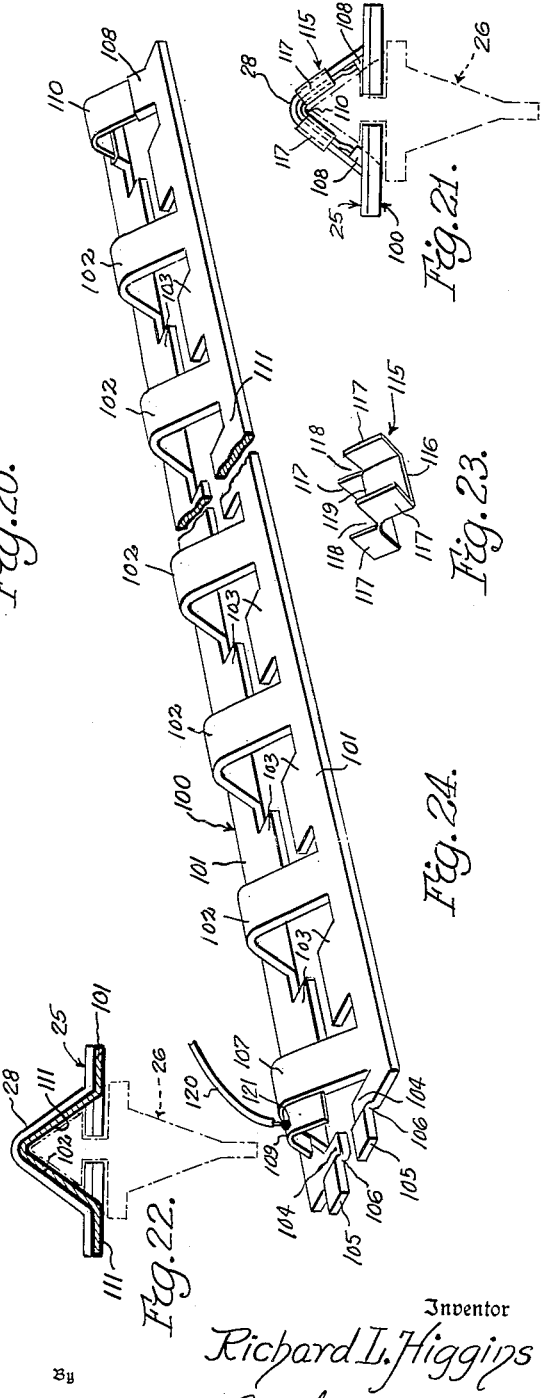

United States Patent Office 2,746,077
Patented May 22, 1956

2,746,077

ELECTRICALLY-HEATED WINDSHIELD WIPER

Richard L. Higgins, Melvindale, Mich.

Application May 31, 1952, Serial No. 290,939

7 Claims. (Cl. 15—250.5)

This invention relates to windshield wipers and, in particular, to electrically-heated windshield wipers.

One object of this invention is to provide an electrically-heated windshield wiper which will prevent stiffening of the blade in freezing weather so that the blade will remain flexible so as to fit curved windshields, and will also melt snow or sleet as it moves across the windshield, as well as prevent ice from forming on the blade.

Another object is to provide an electrically-heated windshield wiper wherein the heater is attachable to a conventional commercially available windshield wiper without requiring structural alterations therein.

Another object is to provide an electrically-heated windshield wiper wherein the heater includes a thin elongated insulated heating element which slides into the same portion of the blade holder as the blade itself, and fits into the grooves customarily provided in conventional windshield wiper blades so as to prevent the gathering of ice therein.

Another object is to provide an electrically-heated windshield wiper of the foregoing character wherein the outer end of the heating element and windshield wiper are closed by an end cap which also covers the terminals to which are attached the electric wires for energizing the heating element.

Another object is to provide a windshield wiper blade heater which can be sold in a kit and applied to conventional windshield wipers already installed upon automobiles and not requiring installation at the factory, so that the automobile owner himself can install the heater, if he so desires.

Other objects and advantages of the invention will become apparent during the course of the following description of the accompanying drawings, wherein:

Figure 1 is a side elevation of a conventional windshield wiper equipped with a windshield wiper blade heater according to one form of the invention, but with the wiper operating mechanism omitted;

Figure 2 is a top plan view of the windshield wiper and heater shown in Figure 1, with the rearward end thereof broken away to conserve space;

Figure 3 is a top plan view of the heating element and the blade, showing their relationship to one another;

Figure 4 is a side elevation of the assembly shown in Figure 3;

Figure 5 is a left-hand end elevation of the assembly shown in Figures 3 and 4;

Figure 6 is an enlarged top plan view of the left-hand end of Figure 2;

Figure 7 is a vertical cross-section taken along the line 7—7 in Figure 6;

Figure 8 is a horizontal section taken along the line 8—8 in Figure 7;

Figure 9 is a longitudinal section taken along the line 9—9 in Figure 6;

Figure 10 is a perspective view of the left-hand end of the blade retainer in a conventional windshield wiper;

Figure 11 is a fragmentary top plan view of a portion of the blade retainer of Figure 10 equipped with a blade heating element according to the present invention, showing the detent kinks in the heating element;

Figure 12 is a fragmentary side elevation of the structure shown in Figure 11;

Figure 13 is an enlarged cross-section through one of the side members of the windshield wiper heating element;

Figure 14 is a top plan view, partly in section, of a modified windshield wiper blade heater in position in the blade holder;

Figure 15 is a side elevation, partly in section, of the assembly shown in Figure 14;

Figure 16 is a right-hand end elevation of the assembly shown in Figure 15;

Figure 17 is a vertical section taken along the line 17—17 in Figure 16;

Figure 18 is a perspective view of the blade heating element shown in Figures 14 to 16 inclusive;

Figure 19 is a top plan view of a further modification of the windshield wiper blade heater in position in the blade holder;

Figure 20 is a side elevation of the assembly shown in Figure 19;

Figure 21 is a right-hand end elevation of the assembly shown in Figures 19 and 20;

Figure 22 is a cross-section taken along the line 22—22 in Figure 20;

Figure 23 is a perspective view of the connecting clip used in the assembly shown in Figures 19 and 20; and Figure 24 is a perspective view of the blade-heating element shown in Figures 17 to 22 inclusive.

When used in extremely cold weather, windshield wipers are often unsatisfactory, especially when sleet forms on the windshield. The cold weather causes the rubber of the windshield wiper blade to stiffen, so that it does not properly flex as it passes to and fro across the windshield. This defect becomes especially serious in connection with curved windshields because of the fact that the wiper blade no longer properly engages the windshield during its entire path of motion to and fro across the windshield. Windshield wiper blade heaters hitherto devised have been unsatisfactory because they required windshield wipers of special construction, thereby requiring the installation of new windshield wipers either at the factory or by the owner of the automobile.

The present invention provides a windshield wiper blade heater which is applicable to existing windshield wipers of conventional construction, which requires no modification or alteration of the windshield wiper structure, and can be sold as a separate kit and installed by the automobile owner. The windshield wiper blade heater of the present invention can also be installed by the manufacturer of present windshield wipers without requiring the making of any changes in the construction thereof. The invention also applies heat adjacent the groove in the windshield wiper blade where ice ordinarily gathers, as well as heating the blade itself.

Referring to the drawings, Figures 1 and 2 show an electrically-heated windshield wiper, generally designated 10, according to one form of the invention, with the wiper-operating mechanism omitted and consisting generally of the windshield wiper, generally designated 11, and the windshield wiper heater, generally designated 12. The windshield wiper 11 is attached to the usual swinging arm 13 which in turn is moved to and fro across the windshield by the usual windshield wiper operating mechanism (not shown). The end 14 of the arm 13 is detachably secured in a socket 15 contained within a hollow box-like member 16 and held in position by an internal leaf spring (not shown). The member 16 is secured to an arcuate channel member 17 in any suitable manner, as by interengaging tabs (not shown), and the opposite ends of the main channel members 17 are provided with inwardly-facing tabs 18 which engage corresponding notches 19 in subsidiary arcuate channel members 20 so as to provide a rocking connection therebetween. Each subsidiary channel member 20 is provided at its opposite ends with outwardly-extending U-shaped tabs 21 (Figure 6) with inwardly bent ends 22 (Figure 9). The tabs 21 loosely and slidably engage an elongated windshield wiper blade holder, generally designated 25 (Figure 10) adapted to contain an elongated resilient windshield wiper blade 26 of elastic deformable material such as natural or synthetic rubber or a compound of both.

The windshield wiper blade holder 25 is a stamping made from a single strip of spring steel and consists of a pair of parallel elongated side members 27 in the form of long thin strips of metal interconnected by humplike bridge members 28 of inverted V-shaped form spaced apart from one another longitudinally along substantially the entire length of the blade holder 25. Projecting into the spaces between the bridge portions 28 are longitudinally-spaced teeth or tongues 29 directed toward one another from the side members 27. The inner edges 30 of the side members 27 are thus separated from one another by a greater distance than the distance between the inner ends 31 of the tongues 29.

The opposite ends of the blade holder 25 are provided with notches 32 for receiving retaining buttons 33 (right-hand end of Figure 1) which are slotted as at 34 to receive the end portions 35 of the side members 27. The end portions 35 have inner edges 36 parallel to one another (Figure 10) and more closely approaching one another than the inner edges 30 in the intermediate portion of the holder 25, these being separated from one another by approximately the same distance as the inner edges or ends 31 of the tongues 29. The right-hand end portion of the blade holder 25 is provided with a laterally-widened portion 37 (Figure 1) containing a notch 38 which is slightly longer than the U-shaped tab 21 adjacent it, so that the tab 21 snaps into this notch 38 so as to retain the holder 25 in assembly while permitting a small amount of endwise play or movement.

The windshield wiper blade 26 mounted in the windshield wiper blade holder 25 consists of an elongated body 40 having a thin wiping portion 41 (Figure 7) along one edge thereof. Inward of the thin wiping edge 41 the blade body 40 is widened by flaring its opposite sides 42 inward so as to provide a thickened base portion 43 of approximately triangular cross-section having outwardly projecting flanges 44. Immediately above the flanges 44, the blade body 40 is provided with inwardly-extending longitudinal grooves 45 interconnected by a narrow neck portion 46. Above the grooves 45, the blade body 40 is provided with a rib 47 of approximately triangular cross-section with longitudinal edges 48 forming flanges overhanging the grooves 45. The width of the blade rib 47 however is less than the width of the blade body 40 between the opposite sides of the flanges 44. The width of the neck portion 46 between the grooves 45 is also slightly less than the separation of the opposite edges 31 and 36 of the tongues 29 and end portions 35 of the blade holder respectively. In this manner, the blade 26 is loosely and slidably received in the blade holder 25 between the tongues 29 and end portions 35, the bridge portions 28 spanning over the rib 47 of the blade body 40 (Figure 7).

The width of the grooves 45 in the windshield wiper blade body 40 as actually manufactured is considerably greater than the thickness of the tongues 29 and remaining portions of the blade holder 25 so that the blade 26 fits loosely into the space provided for it between the tongues 29. Moreover, the excessive width of the grooves 46 provides an adequate space for receiving the windshield wiper blade heater 12 of the present invention. All of the construction designated by the foregoing reference numerals is conventional and its details are beyond the scope of the present invention.

The windshield wiper blade heater 12 consists of a heating element 50 stamped from an elongated strip of high resistance metal suitable for electrical heating elements. One suitable metal is a nickel-chromium alloy or a nickel, iron and chromium alloy. Such alloys for electrical resistance devices and electrical heating apparatus are well-known to those skilled in the electrical heating art and are available on the market under various trade names such as, for example, the trade name "Nichrome." The heating element 50 consists of a pair of elongated strips or side members 51 of the said alloy, interconnected at one end by a bridge portion 52 (Figure 3) so that the heating element 50 is approximately U-shaped when seen in top plan view. The inner edges 53 of the side members 51 are separated from one another by approximately the same distance as the opposite ends 31 of the tongues 29, so as to similarly enter and be received within the oppositely-facing grooves 45 in the wiper blade body 40 (Figure 7).

The free ends of the heating element 51 at the opposite end thereof from the bridge portion 52 are provided with outwardly-extending terminals 54 (Figure 7), the outer portions 55 of which are bent upward and their ends bent into loops 56 to provide terminals for receiving the ends of the energizing wires 57 and 58. The latter are received within insulation so as to form a cable 59 and attached by clips 60 and 61 to the main channel member 17 and swinging arm 13 respectively. The cable 59 extends along the arm 13 to a location adjacent its point of connection with the windshield wiper driving shaft (not shown) and thence runs by way of a conventional control switch to an electrical connection with the storage battery of the automobile (not shown). In order to prevent accidental end motion of the heating element 50, the side members 51 thereof are provided with hump-like detent kinks 62 (Figures 3, 4, 11 and 12) which project upward into space between two of the tongues 29 on the blade holder 25 and snap into place. The humps or kinks 62 are low in height having end portions 63 and a top portion 64 having a length slightly less than the longitudinal separation of the tongues 29.

The heating element 50 is coated with a thin layer 65 of heat-resisting electrical insulting material, such as a silicone or silicone derivative, such materials being available upon the open market for this purpose. This insulating coating or layer 65, which may be applied by dipping the heating element 50 in a silicone solution, prevents short-circuiting of the side members 51 of the heating element 50 by contact with the wiper blade holder 25. In order to cover the terminals 54, the button 33 supplied by the windshield wiper manufacturer is removed from one end of the windshield wiper 11 and replaced by a special end cap 66 forming a part of the kit containing the heater 12. The cap 66 is preferably of elastic deformable material such as natural or synthetic rubber or a compound thereof, having a top portion 67 with downwardly-extending side portions 68 (Figure 7) having inwardly-bent lower edge portions 69 which snap over the terminals 54 and extend beneath them. The cap 66 is provided with a central groove 70 for receiving the bridge portion 28 at the end of the blade holder 25 and is also provided with side grooves 71 and 72 for receiving the loops 56 and their wires 57 and 58. The cap 66 is also provided with a slot 73 through its end wall 74 (Figure 9) for receiving the end portions 35 of the blade holder 25.

Figures 3, 4 and 5 are provided for showing the relationship of the heating element 50 of the heater 12 and the blade 26 in a simple and easily understood manner, without the complicated construction of the blade holder 25 being present. As explained below in connection with the assembly and operation of the invention, however, the heater 12 and blade 26 are not necessarily assembled in this manner before inserting the holder 25, the heating element 50 being most easily inserted after the blade 26.

In the installation of the windshield wiper blade heater 12 of the invention, let it be assumed that the windshield wiper 11 is in position on the automobile, and that there is a button 33 on each end thereof. To install the heater 12, the operator removes one of the buttons 33 and also removes the blade 26 by sliding it endwise out of the blade holder 25. The operator then threads the heating element 50 into the space adjacent and beneath the blade holder 25 so that the two lie alongside one another with the humps or detent kinks 62 disposed between adjacent tongues 29. Holding these members in position with the fingers, the operator then slides the windshield wiper blade 26 into the position shown in Figure 7, so that the tongues 29 and heating element 50 lie one above the other in superimposed assembly. The terminals 54, which are preferably supplied in the same horizontal plane as the heating element side members 51, are now bent upward in the portions 55, the wires 57 and 58 are inserted into the loops 56 and secured thereon, and the end cap 66 is placed over this assembly in order to protect it and hold the various elements in position.

The clips 21, however, are not tightened but are left in a loose condition, so that the blade holder 25, heating element 60 and blade 26 can flex freely and slide endwise to a slight extent as the blade passes to and fro over a curved windshield. If, while driving, sleet commences to form on the windshield, the operator energizes the wires 57 and 58, causing a flow of current through the heating element 50 and thereby causing the latter to generate heat. This heat is transmitted to the blade 26 not only directly but also through the blade holder 25, and not only melts the sleet already on the windshield, but also prevents the gathering of ice and snow in the grooves 45 and adjacent portions of the windshield wiper 11. The electrical circuit for the heater 12 is preferably provided with a rheostat switch enabling different degrees of heat to be generated, according to whether the weather is mild, cold or very cold, or according to the speed at which the automobile is travelling or the speed at which the sleet is being deposited upon the windshield. The present invention is also very useful when the operator returns to his car after the latter has been parked and the blade is frozen into a deposit of snow or sleet upon the windshield. The operator then merely turns on the heat, which immediately melts the snow or ice and renders the blade flexible before the car is placed in motion.

It will be obvious that the terminals 54 of the heating element 50 may project longitudinally from the free ends thereof rather than laterally, as shown.

The modified windshield wiper blade heating element, generally designated 80, shown in Figures 14 to 18 inclusive and constituting the second form of the invention, is generally similar to the heating element 50 of the heater 12 (Figures 3 and 4), but fits more closely into the windshield wiper blade holder 25. The heating element 80, like the heating element 50 is stamped from an elongated strip of high resistance metal in approximately U-shaped form with side members 81 interconnected by an inverted V-shaped bridge portion 82 at its rearward end. At their forward ends, the side members 81 are provided with upwardly-offset forwardly-projecting tabs 83 connected to the side members 81 by downwardly-bent portions 84, so that the tabs 83 are on slightly higher levels than the side portions 81.

Immediately adjacent the tabs 83, the side members 81 are provided with upwardly-inclined fingers 85 having substantially the same inclination as the bridge member 82 which in turn has a configuration adapting it to nest with the bridge portions 28 of the blade holder 25 (Figure 10). Also nesting with the bridge portions 28 intermediate the opposite ends of the heating element 81 are upwardly-inclined fingers 86, and between them are disposed inwardly-projecting tongues 87 occupying locations similar to the tongues 29 of the holder 25 and adapted to rest against them. The fingers 85 and 86 are of similar construction, except that the fingers 85 have forwardly-projecting terminals or connection tabs 88 to which the wires 57 and 58 are connected for energizing the heater as in the form of the invention shown in Figures 1 to 13 inclusive. Preferably, after the wires 57 and 58 have been soldered or otherwise attached to the tabs 88 at 89, the entire heating element 80 is dipped in an insulating material, such as a silicone compound dissolved in a solvent, so as to deposit an insulating coating 90 thereover (Figure 17) which will also withstand the heat developed in operation.

The installation of the heating element 80 in the blade holder 25 is accomplished by hooking the tabs 83 over the portions of the blade holder 25 located between the notches 32 and the first bridge member 28 (Figures 10, 14 and 15). The fingers 85 and 86 are then pushed up into the space beneath the bridge portions 28 with the tongues 87 disposed beneath the tongues 29 (Figures 16 and 17). The resulting assembly, generally designated 91, is shown in Figures 14 and 15, and the windshield wiper blade 26 is then inserted into the dotted line position (Figures 16 and 17) in the manner previously described above by sliding it inward from the front end of the windshield wiper heating element and blade holder assembly 91 of Figures 14 to 17 inclusive.

In the operation of the second form of the invention, assuming that the parts have been assembled as described immediately above, to heat the windshield wiper blade 26, the operator, as before, energizes the wires 57 and 58 from the vehicle battery, causing heat to be developed by the flow of current through the heating element 80. The heating of the heating element 80 transmits heat both to the blade holder 25 and wiper blade 26, melting the sleet and snow on the windshield and also on the windshield wiper itself. The remainder of the operation is similar to that described above in connection with the first form of the invention.

The further modified windshield wiper blade heating element, generally designated 100, shown in Figures 19 to 24 inclusive and constituting the third form of the invention, differs from the preceding forms in that the heating element 90 does not possess a U-shaped electrical circuit but current merely flows from the forward end to the rearward end, where the heating element is grounded to the windshield wiper blade holder 25 which in turn is grounded to the frame of the automobile.

In particular, the blade heating element 100 closely resembles the windshield wiper blade holder 25 with which it interfits. It consists of a thin sheet metal stamping having elongated side portions 101 interconnected by inverted V-shaped bridge portions 102 at intervals therealong closely resembling the bridge portions 28 of the blade holder 25 (Figure 10). Interposed between the bridge portions 102 are inwardly-projecting tongues 103 projecting toward one another in the plane of the side members 101 and resembling the tongues 29 of the holder 25. The side portions 101 at their forward ends are provided with inwardly-projecting tongues 104 from which vertically offset tabs 105 project forwardly and are connected by bent portions 106 to the tongues 104 (Figure 24). The foremost and rearmost bridge portions 107 and 108 respectively differ from the intermediate bridge portions 102 in that an inverted V-shaped bare terminal 109 projects forwardly from the bridge portion 107, whereas the rearmost bridge portion 108 has a bare apex portion 110, the remainder of the heating element 100 being coated with a layer 111 of heat-withstanding insulating material, such as the silicone material previously mentioned.

The installation of the heating element 100 in the blade holder 25 is accomplished in a similar manner to that of the heating element 80 described above, namely by hooking the tabs 105 over the forward portion of the blade holder 25 and pushing the bridge members 102, 107 and 108 upward into engagement with the under surfaces of the bridge members 28 of the holder 25. The bare portion 110 of the rearmost bridge member 108 is brought into firm electrical contact with the rearmost bridge member 28 of the holder 25 and a clip, generally designated 115 (Figure 23) is bent over and around both portions to lock them firmly together. The clip 115 consists of an inverted V-shaped sheet metal piece 116 having tabs 117 projecting upwardly therefrom and separated from one another by a V-shaped gap 118 at the apex 119 of the V-shaped member 116. The tabs 117 are bent toward one another to lock the parts together (Figures 19, 20 and 21). A wire 120 is then connected as by soldering it at 121 to the terminal portion 109 and in turn connected to the battery circuit. The windshield wiper blade 26 is then inserted by sliding it in from the forward end of the assembly 122 in a manner similar to that described above in connection with the second form of the invention shown in Figures 14 to 18 inclusive.

In the operation of the third form of the invention, the operator energizes the wire 120 from the vehicle battery, the opposite end of the heating element 100 being energized by the contact of its bare portion 110 on the bridge member 108 by its contact with the blade holder 25, which as previously stated, has been grounded. Heat is generated by passing from one end to the other of the heating element 100, heating up the heating element and consequently heating the windshield wiper blade 26 and blade holder 25, as before.

It will be evident to those skilled in the electrical art that definite and specific tabs 55 (Figures 4 and 5), 88 (Figures 14 to 18 inclusive) and 109 (Figures 19 to 24 inclusive) need not be provided for terminals, because the electrical conductors such as wires may be soldered or otherwise electrically connected to any uninsulated part of the heating element which thereby serves as a terminal. In Figure 24, for example, the heating element 100 has one terminal 109 at one end and a bare portion 110 on the projection 108 at the other end which serves as the terminal at said other end by making contact with the blade holder 25 which itself is grounded.

What I claim is:

1. In combination with the elongated longitudinally-grooved flexible rubber-like blade of a windshield wiper, an owner-installable wiper blade heating element comprising an elongated strip of electrically-conducting electrically-resistant flexible sheet material of approximately U-shaped form having elongated side members configured to lie alongside said blade externally thereof but substantially in contacting engagement therewith and having a portion extending into the blade groove, said heating element having a pair of terminals thereon at spaced locations therealong for connection of an electrical energization circuit.

2. In combination with the elongated longitudinally-oppositely-grooved flexible rubber-like blade of a windshield wiper, an owner-installable wiper blade heating element comprising an elongated strip of electrically-conducting electrically-resistant flexible sheet material of approximately U-shaped form having elongated side members configured to lie alongside said blade in close proximity thereto, said side members having portions extending into the blade grooves on opposite sides of said blade, said heating element having a pair of terminals thereon at spaced locations therealong for connection of an electrical energization circuit.

3. In combination with an elongated windshield wiper blade holder and an elongated longitudinally-oppositely-grooved flexible rubber-like wiper blade held therein, an owner-installable wiper blade heating element comprising an elongated strip of electrically-conducting electrically-resistant flexible sheet material having an elongated longitudinal slot extending inwardly from one end thereof to a location adjacent the other end thereof and forming two elongated arms and a bridge portion interconnecting said arms at said other end, said arms being configured to lie alongside said blade externally thereof but substantially in contacting engagement therewith between said blade and said holder and having on opposite sides of said slot a plurality of spaced opposite portions extending into the blade grooves, said heating element having a pair of terminals thereon at spaced locations therealong for connection of an electrical energization circuit.

4. In combination with an elongated windshield wiper blade holder and an elongated longitudinally-oppositely-grooved flexible rubber-like wiper blade held therein, an owner-installable wiper blade heating element comprising an elongated strip of electrically-conducting electrically-resistant flexible sheet material having an elongated longitudinal slot extending inwardly from one end thereof to a location adjacent the other end thereof and forming two elongated arms and a bridge portion interconnecting said arms at said other end, said arms being configured to lie alongside said blade between said blade and said holder, said heating element having a pair of terminals thereon at spaced locations therealong for connection of an electrical energization circuit, said heating element having longitudinally-spaced portions projecting laterally out of the plane of said arms at spaced locations therealong, said projecting portions interfitting with and engaging said holder.

5. In combination with an elongated windshield wiper blade holder and an elongated longitudinally-oppositely-grooved flexible rubber-like wiper blade held therein, an owner-installable wiper blade heating element comprising an elongated strip of electrically-conducting electrically-resistant flexible sheet material having an elongated longitudinal slot extending inwardly from one end thereof to a location adjacent the other end thereof and forming two elongated arms and a bridge portion interconnecting said arms at said other end, said arms being configured to lie alongside said blade between said blade and said holder, said heating element having a pair of terminals thereon at spaced locations therealong for connection of an electrical energization circuit, said strip having longitudinally-spaced portions projecting laterally out of the plane of said arms at spaced locations therealong, said projecting portions interfitting with and engaging said holder, said arms on opposite sides of said slot having a plurality of spaced portions projecting into said slot and extending into the blade grooves.

6. In combination with an elongated windshield wiper blade holder and an elongated longitudinally-oppositely-grooved flexible rubber-like wiper blade held therein, an owner-installable wiper blade heating element comprising an elongated strip of electrically-conducting electrically-resistant flexible sheet material having an elongated longitudinal slot extending inwardly from one end thereof to a location adjacent the other end thereof and forming two elongated arms and a bridge portion interconnecting said arms at said other end, said arms being configured to lie alongside said blade between said blade and said holder, said heating element having a pair of terminals thereon at spaced locations therealong for connection of an electrical energization circuit, said strip having arched bridge portions projecting laterally out of the plane of said strip and interconnecting said arms at spaced locations therealong, said bridge portions interfitting with and engaging said holder, said heating element having an insulating coating thereon, a part of one of said bridge portions being free from said insulating coating, said insulation-free part of said one bridge portion being engageable in electrical contact with said blade holder and forming one of said terminals.

7. In combination with an elongated windshield wiper blade holder and an elongated longitudinally-oppositely-grooved flexible rubber-like wiper blade held therein, an owner-installable wiper blade heating element comprising an elongated strip of electrically-conducting electrically-resistant flexible sheet material having an elongated longitudinal slot extending inwardly from one end thereof to a location adjacent the other end thereof and forming two elongated arms and a bridge portion interconnecting said arms at said other end, said arms being configured to lie alongside said blade between said blade and said holder, said heating element having a pair of terminals thereon at spaced locations therealong for connection of an electrical energization circuit, said strip having arched bridge portions projecting laterally out of the plane of said strip and interconnecting said arms at spaced locations therealong, said bridge portions interfitting with and engaging said holder, said heating element having an insulating coating thereon, a part of one of said bridge portions being free from said insulating coating, said insulation-free part of said one bridge portion being engageable in electrical contact with said blade holder and forming one of said terminals and another of said bridge portions spaced away from said insulation-free part forming another of said terminals.

References Cited in the file of this patent

UNITED STATES PATENTS

| | | |
|---|---|---|
| 1,733,948 | Deul et al. | Oct. 29, 1929 |
| 1,833,307 | Riggs | Nov. 24, 1931 |
| 1,845,465 | Wickstrom | Feb. 16, 1932 |
| 2,089,357 | Grece | Aug. 10, 1937 |
| 2,153,544 | Bell | Apr. 11, 1939 |
| 2,427,502 | Marick | Sept. 16, 1947 |
| 2,500,010 | Schoon | Mar. 7, 1950 |
| 2,550,504 | Vidrick et al. | Apr. 24, 1951 |